United States Patent [19]

Winzeler

[11] 4,161,126

[45] Jul. 17, 1979

[54] WINCH CONSTRUCTION HAVING AXIALLY SHIFTABLE FACE GEAR

[75] Inventor: James E. Winzeler, East Peoria, Ill.

[73] Assignee: Caterpillar Tractor Co., Peoria, Ill.

[21] Appl. No.: 767,085

[22] Filed: Feb. 9, 1977

[51] Int. Cl.[2] .............................................. F16H 37/06

[52] U.S. Cl. ........................................ 74/674; 74/753; 254/187.6

[58] Field of Search ..................... 74/750 R, 753, 768, 74/674; 192/12 B, 4 R; 254/187.6, 187.4, 187.5

[56] References Cited

U.S. PATENT DOCUMENTS

| | | | |
|---|---|---|---|
| 2,500,326 | 3/1950 | Shaff | 74/750 R |
| 2,604,798 | 7/1952 | Welsh | 74/750 R |
| 3,055,237 | 9/1962 | Magnuson | 74/750 R |
| 3,319,492 | 5/1967 | Magnuson | 74/750 R |
| 3,460,807 | 8/1969 | Prikhodko et al. | 74/750 R |
| 3,797,325 | 3/1974 | Christison | 254/187.6 |
| 3,850,411 | 11/1974 | Vavilov et al. | 254/187.6 |
| 3,885,656 | 5/1974 | Michling et al. | 192/4 R |

*Primary Examiner*—Benjamin W. Wyche
*Assistant Examiner*—James Yates
*Attorney, Agent, or Firm*—Wegner, Stellman, McCord, Wiles & Wood

[57] ABSTRACT

A winch construction including a frame having a winch drum journalled for rotation thereon, the winch drum having a hollow hub. A bidirectional, rotary output, hydraulic motor is mounted on the frame and has an output shaft extending into the hub. A first set of planetary gears is contained within the hub and includes a sun gear driven by the shaft, a planet gear engaging the sun gear and journalled on a rotatable carrier, and a ring gear engaging the planet gear. A second planetary gear set is disposed within the hub and includes a sun gear, at least one planet gear engaging the sun gear and journalled on the drum within the hub and a ring gear engaging the planet gear. An axially shiftable face gear is coupled to the carrier of the first set for rotation therewith and a motor is provided for selectively axially shifting the face gear between positions engaging the sun gear of the second set and the drum within the hub. A hollow shaft is concentric about the motor shaft and extends within the hub. A third planetary gear set is within the hub and includes a sun gear affixed to the hollow shaft, a planet gear engaging the sun gear and journalled on the frame, and a ring gear engaging the planet gear and carried by the drum within the hub. The ring gears of the first and second sets are coupled to the hollow shaft and the winch includes a normally engaged brake and a coupling between the hollow shaft and the brake including a one-way clutch.

19 Claims, 7 Drawing Figures

174
18
74
164
62
70
66
194
192
178
176
180
122
190
68
60
64
204
128
72
208
30
196
202
136
134
130
198
182
206
124
184
126
142
140
200
170
176
152
154
144
148
146
147
150
151
250

WINCH CONSTRUCTION HAVING AXIALLY SHIFTABLE FACE GEAR

BACKGROUND OF THE INVENTION

This invention relates to winch constructions and, more specifically, winch constructions that are employed in elevating and lowering loads.

There are a variety of winch constructions available in the marketplace presently. Most utilize a single fixed speed reduction gear box connected to a fluid motor in order to provide a given speed of drive for the winch drum or utilize a slow speed, high torque motor connected directly to the drum to provide the desired drum speed.

In many such winches, when used for elevating and lowering loads, when the cable is powered off of the winch drum (as opposed to being pulled off the drum by a load against the usual brake in a winch construction), a not infrequent occurrence is the acceleration of the drum to a speed faster than that at which it is driven due to the weight of the cable and/or a load secured therto which can cause undesirable cavitation in the fluid motor.

In order to provide more flexibility, certain manufacturers have introduced two-speed winch constructions which may be subject to the same deficiency mentioned immediately preceding. In addition, the transmissions for such two-speed winches frequently have been disposed to one or the other side of the drum with the result that the overall winch package is quite large.

Winch constructions also are used in a variety of widely varying climates and in unusually cold climates, upon startup, there may be sluggishness in the interaction of the various components. In the typical construction, sluggishness cannot be overcome without raising or lowering a load or the like and, due to the sluggishness, such a loading operation cannot be conducted properly.

SUMMARY OF THE INVENTION

The present invention is directed to overcoming one or more of the problems set forth above.

For example, a small size multiple speed winch construction can be achieved according to the invention is one including a winch drum journalled for rotation having a hollow hub. A motor has a rotary output for driving the drum and a transmission comprising at least two planetary gear sets is disposed within the hollow hub for coupling the motor and the drum to conserve space. Means are provided for selectively coupling the planetary gear sets to the motor and to the drum for at least two different gear ratios.

Where the problem of sluggishness during startup is to be overcome, the invention contemplates a winch construction including a winch drum journalled for rotation, a motor having a rotary output for driving the drum, a transmission comprising at least two planetary gear sets for coupling the motor and the drum, and a means for selectively coupling the planetary gear sets to the motor and drum in at least two different gear ratios and including an axially shiftable face gear having teeth on opposite sides thereof which may be disengaged to allow the motor to be driven for warmup purposes without driving the drum.

Where the problem of cavitation is to be overcome, the invention contemplates a winch construction including a frame, a winch drum journalled on the frame, a bidirectional, rotary output, hydraulic motor for driving the drum, and a first planetary gear set connected to the motor and connectable directly to the drum. A second planetary gear set is coupled to the drum and to the first planetary gear set and a one-way clutch is coupled to the first set such that for one direction of rotation of the motor, when the first set is coupled to the drum, the drum will be positively driven in one direction. The arrangement is also such that for the opposite rotation of the motor, a part of the first set will be braked to drive the drum through the second set in the opposite direction and allow the drum to overrun the motor while precluding the cavitation in the motor.

Where more than one of the foregoing problems is to be overcome, the invention contemplates winch constructions having combinations of the various features set forth above.

Other objects and advantages will become apparent from the following specification taken in connection with the accompanying drawings.

DESCRIPTION OF THE PREFERRED EMBODIMENT

Typical Environment Of Use

Figure 1:
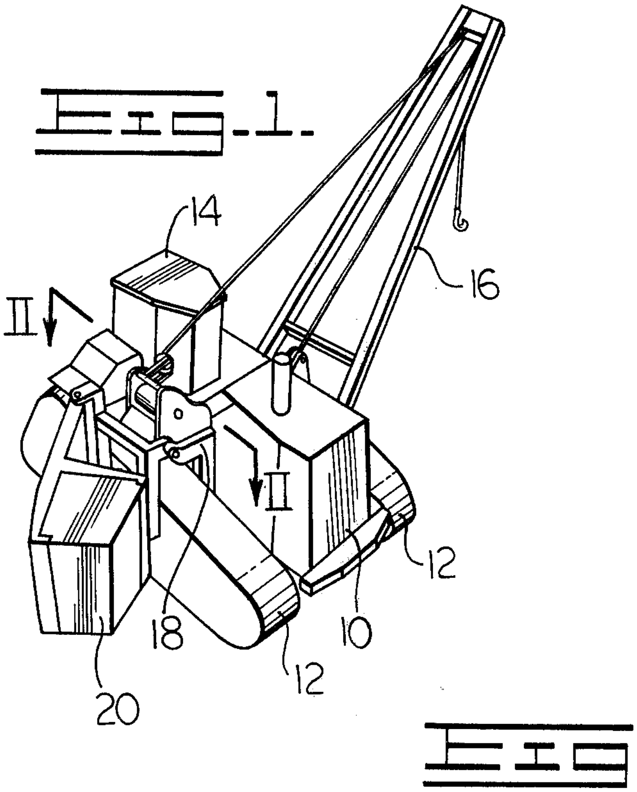
FIG. 1 is a perspective view of a work performing vehicle, a pipe layer, utilizing a winch made according to the invention.
Figure 2:
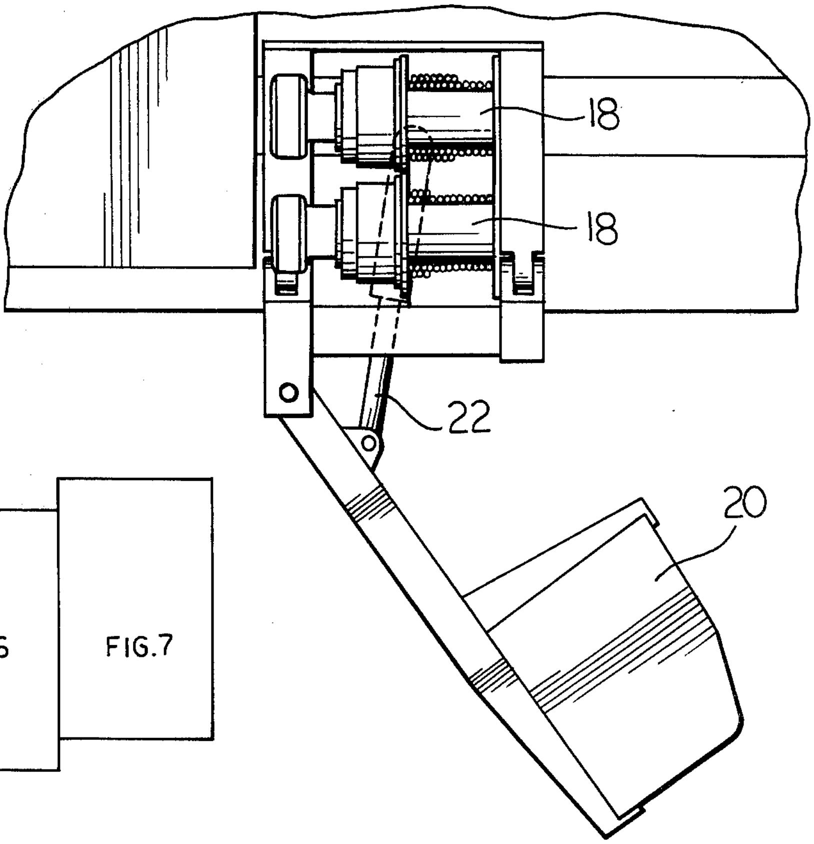
FIG. 2 is an enlarged, fragmentary plan view illustrating a multiple winch assemblage utilizing winches according to the invention.
Figure 4:
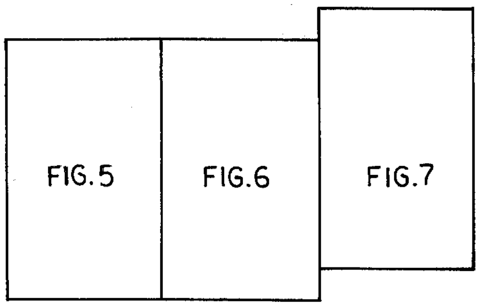
FIG. 4 illustrates the interrelationship of FIGS. 5, 6 and 7 to each other.

One typical use to which a winch construction made according to the invention may be put is in connection with apparatus for raising and lowering loads. As seen in FIGS. 1 and 2, such an apparatus may include a vehicle 10 having crawler-type tracks 12 and an operator cab 14. To one side of the vehicle 10, there is pivotally mounted a boom 16 and, at the opposite side, a pair of winch constructions 18 made according to the invention. In the particular use shown, the vehicle 10 is a pipe layer and includes a pivotal counterweight 20 on the side of the vehicle opposite from the boom along a hydraulic motor 22 for changing the location of the counterweight 20 with respect to the centerline of the vehicle to counterbalance any load being carried by the boom 16.

The invention is not limited to use with pipe layers or, for that matter, limited to winches used solely for elevating and lowering loads. It can be used with efficacy in other areas where winches have been heretofore used as, for example, dragging loads, or the like.

General Description

As mentioned immediately preceding, the winch construction of the invention is not limited to use where loads are to be elevated or lowered, but it is primarily intended for such use. With the foregoing in mind, reference is made to FIG. 3 which illustrates the winch construction in a schematic form so as to facilitate an understanding of the interrelationship of the major components of the construction as well as their functions in intended modes of operation.

The winch construction includes a motor shaft 30 which extends into the hollow hub 32 of a winch drum 34 and mounts a sun gear 36 of a planetary gear set, generally designated 38. The first set 38 includes at least one planet gear 40 and a ring gear 42 along with a carrier 4 journalling the planet gear 40. The carrier 44 is connected to a shaft 46 which mounts a selectively operable coupling, generally designated 48. The coupling 48 is axially shiftable from the neutral position schematically illustrated in FIG. 3 to the right into driving engagement with a sun gear 50 of a second planetary gear set, generally designated 52. The coupling 48 is also shiftable to the left to be engaged directly with the winch drum 34 within the hub 32 thereof.

A one-way clutch 54, preferably a sprag brake, receives the shaft 46 and is stationarily mounted on the frame of the winch construction. The arrangement is such that the shaft 46 will overrun the brake 54 when rotated in a clockwise direction, as viewed in FIG. 3, but will be braked by the brake 54 against counterclockwise rotation.

The second planetary gear set 52 includes a planet gear 56 along with a ring gear 58 which is coupled to the ring gear 42 of the first set 38 and to a hollow shaft 60 which extends into the hub 32 and is disposed about the motor shaft 30 and journalled relative to the drum. Within the hub 32, there is disposed a third planetary gear set, generally designated 62, which includes a sun gear 64 affixed to the hollow shaft 60 and a planet gear 66 journalled to the frame of the winch, schematically indicated at 68. A ring gear 70 in the third set 62 is carried by the interior of the hub 32.

An end of the hollow shaft 60 exterior of the hub 32 mounts a one-way clutch 72 of the roller type which, in turn, is connected to a normally engaged brake, generally designated 74, of the spring-engaged, hydraulically-disengaged type. The arrangement is such that the shaft 60 will overrun the clutch 72 when driven in a counterclockwise direction, as viewed in FIG. 3, but will be braked by the brake 74 to the extent that it is engaged when rotated in a clockwise direction.

A metering pump 76 is coupled to the assemblage, and specifically, the one-way clutch 72 on the side thereof remote from the shaft 60 so as to be driven only when the shaft 60 is coupled to the brake 74 through the one-way clutch 72 and is permitted to rotate.

When it is desired to raise a load, that is, take in cable, at high speed, the coupling 48 is shifted to the left to engage the drum 34 directly and couple it to the carrier 44 of the first planetary gear set 38. The motor shaft 30 will then be driven in a clockwise direction by a hydraulic motor. As a consequence, the drum will be driven clockwise at a speed reduced from that of the shaft 30, dependent upon the precise gear ratio of the first planetary gear set 38 and the third planetary gear set 62. The shaft 60 will be driven in a counterclockwise direction and will overrun the brake 72. In the event of a power failure during the elevation of a load resulting in the load, through the force of gravity, attempting to pull cable off of the drum 34 and rotate the same in a counterclockwise direction, the normal engagement of the brake 74 will prevent reverse rotation of the shaft 60, and thus counterclockwise rotation of the drum 34.

In the event a low speed raising of a load is required, the same steps are performed with the exception that the coupling 48 is axially shifted to the right to engage the sun gear 50 of the second planetary gear set 52 prior to the rotation of the motor shaft 30. As a consequence, the drum 34, due to its connection to the planet gear 56 in the second set 52 will be driven in a clockwise direction at a speed reduced from that of the shaft 30 by both the first, second and third planetary gear sets 38, 52 and 62, respectively. Reverse rotation of the drum 34 in the event of power failure is precluded in the same manner as during high speed operation.

Figure 3:
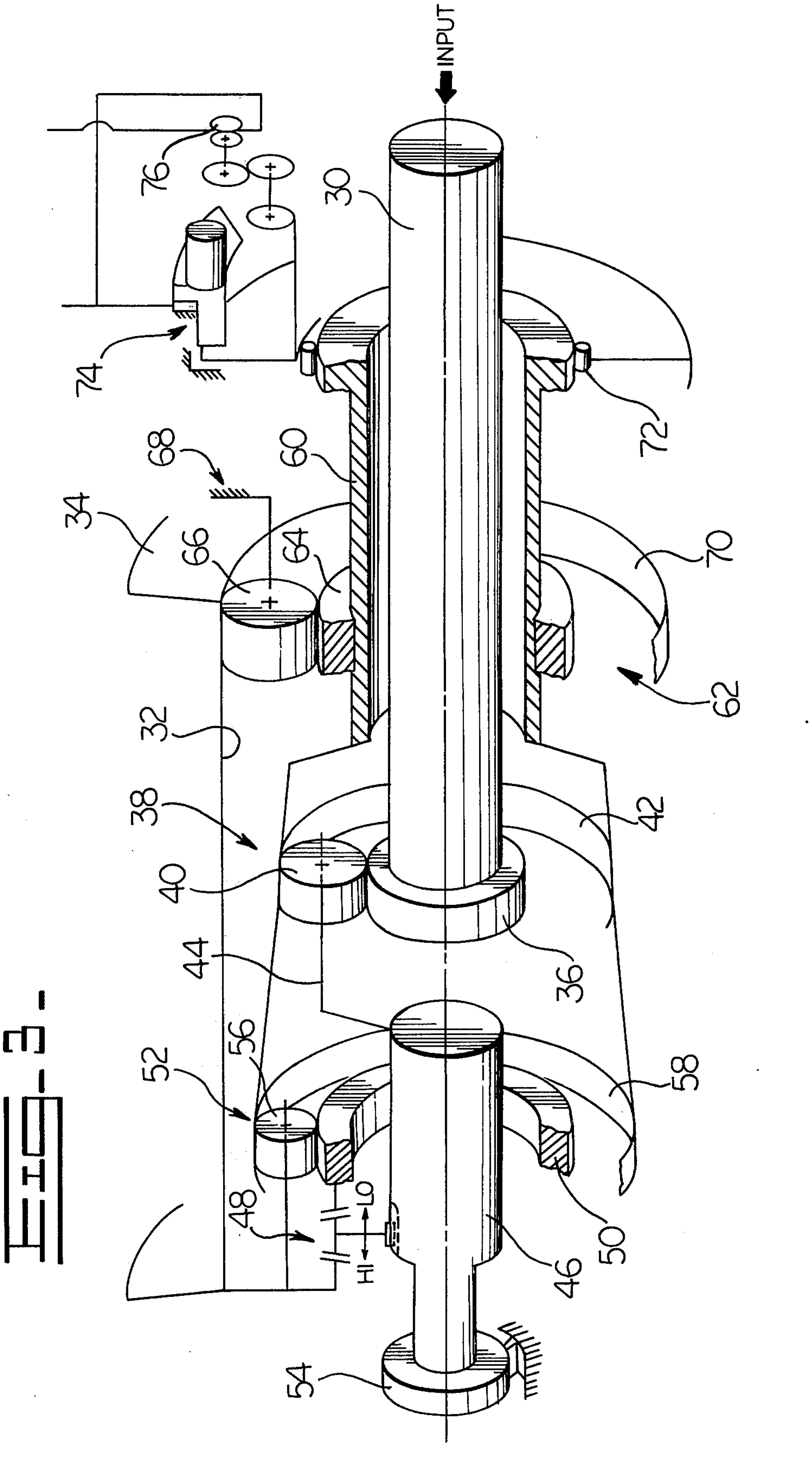
FIG. 3 is a schematic of the major mechanical components of a winch construction made according to the invention.

When it is desired to lower a load against the brake, the coupling 48 is placed in its neutral position, that is, that shown in FIG. 3. Hydraulic pressure is applied to the brake 74 to release the same to some desired degree, thereby allowing the shaft 60 to rotate in a clockwise direction when load torque begins to exceed brake torque and allowing the drum 34 to rotate in a counterclockwise direction. At the same time, the metering pump 76 will be driven and provides a control signal to control the rate of lowering in a conventional fashion.

When it is desired to power the cable off of the drum 34, the brake 74 is hydraulically released and the coupling 48 is maintained in its neutral position. The shaft 30 is rotated in a counterclockwise direction. At this time, the sprag brake 54 precludes the shaft 46 from rotating in a counterclockwise direction thereby holding the carrier 44 of the first planetary gear set 38 stationary. As a consequence, the rotation of the sun gear 36 and the fixing of the position of the planet gear 40 will cause the ring gear 42 to rotate in a clockwise direction thereby rotating the shaft 60 in a clockwise direction and, in turn, drive the drum 34 in a counterclockwise direction. Should the weight of the load and/or cable, in such a mode of operation, accelerate the drum 34 to a rotational speed faster than that provided by the rotation of the shaft 30, the rate of rotation of the ring gear 42 will increase to the point that the carrier 44 will be driven in a clockwise direction and overrun the sprag brake 54 and due to the resistance of the motor to being driven as a pump rather than a motor which tends to fix the speed of the sun gear 36. Consequently, such an increased rate of rotation of the drum 34 cannot drive the motor shaft 30 such that the motor associated therewith would act as a pump rather than a motor and cause cavitation.

When it is desired to warm up the system to preclude sluggishness during operation, but without changing cable positions, the coupling 48 may be placed in its neutral position as illustrated and the motor shaft 30 driven in a clockwise direction in the usual fashion. This will cause rotation of the sun gear 36 and planet gear 40 in the first set 38 but no rotation of the drum 34. This enables the construction to be "warmed up" as long as is necessary to prevent sluggish operation and does not require shifting of the drum 34 and the cable associated therewith.

Specific Description

Figure 5:
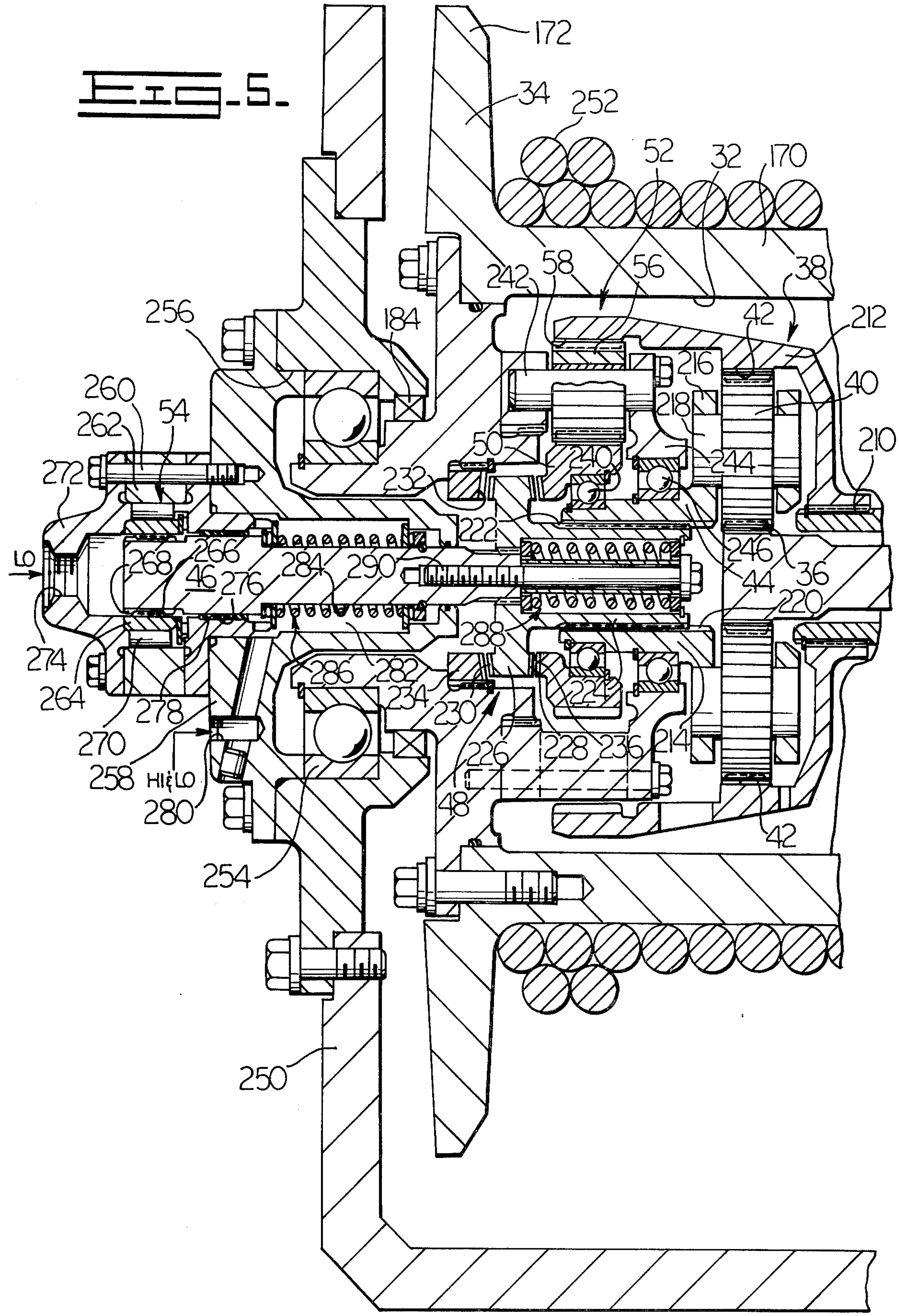
FIGS. 5, 6 and 7 are sectional views of various parts of a winch construction made according to the invention to be assembled together as directed by FIG. 4.
Figure 6:
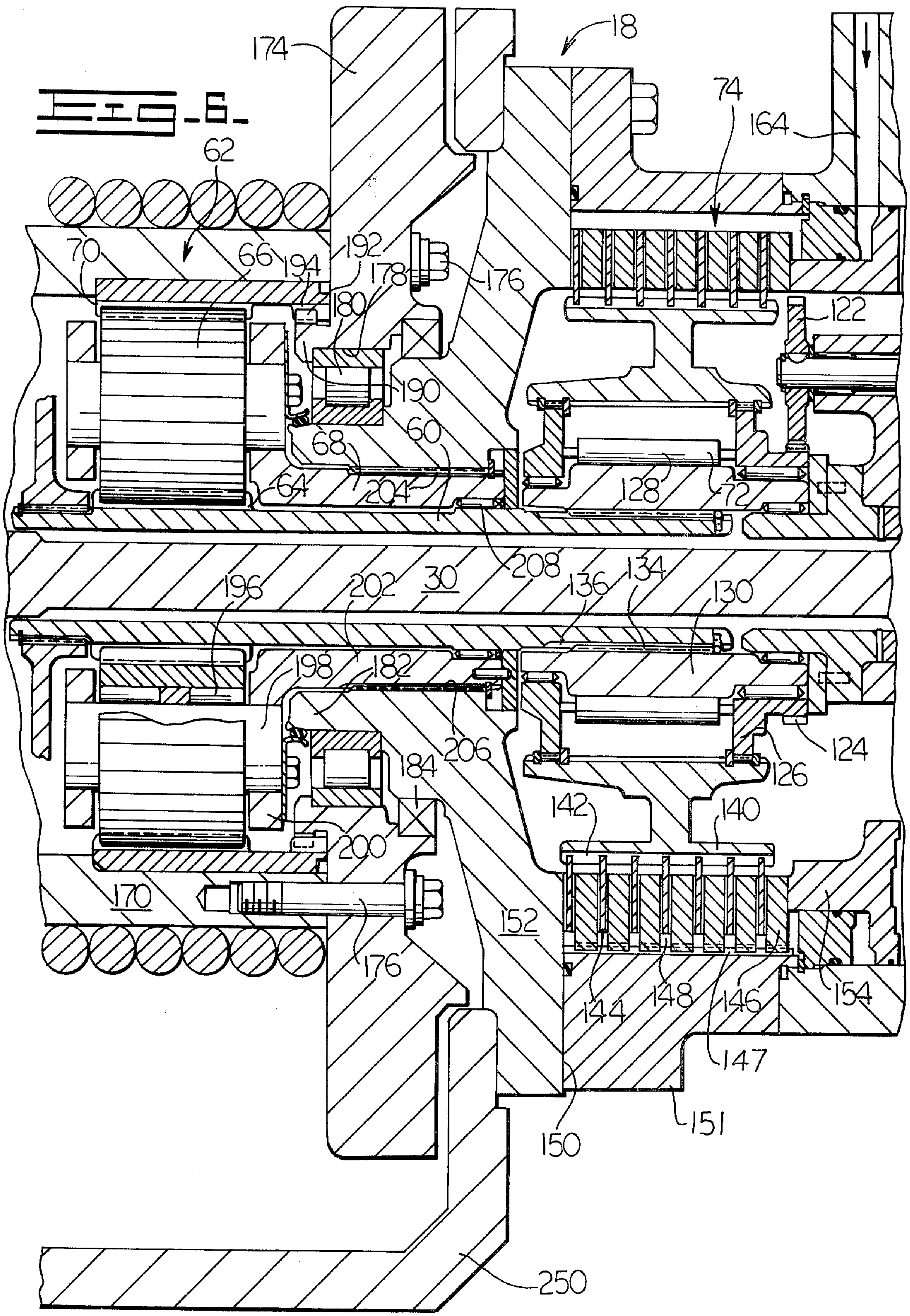
Figure 7:
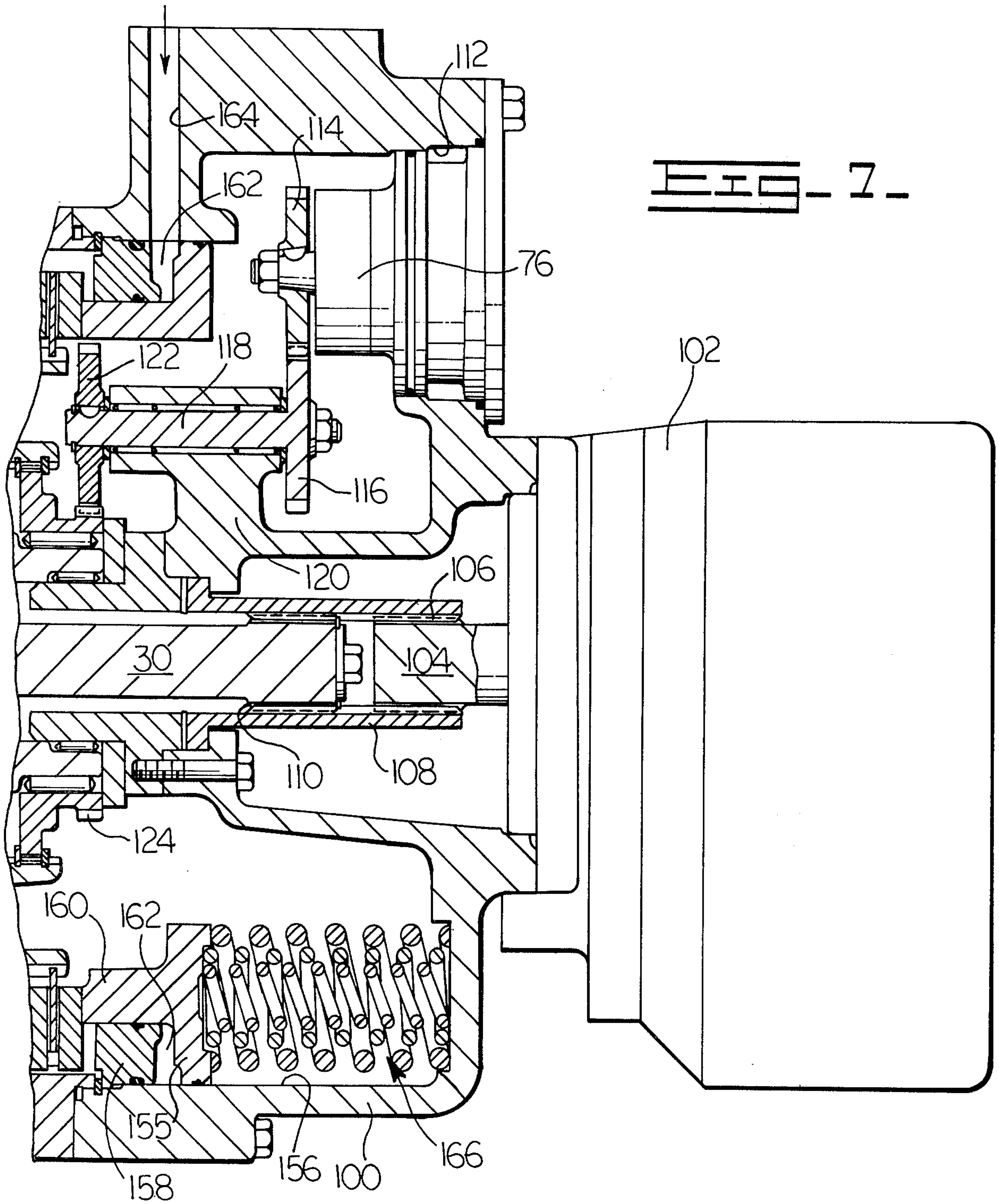

Turning now to FIGS. 5, 6 and 7, the mechanical details of the construction will be discussed in greater detail.

The winch construction includes a bell housing 100 which mounts, in any suitable fashion, a bidirectional, rotary output, hydraulic motor 102 having an output shaft 104. Splines 106 on the shaft 104 and a splined coupling 108 connect the shaft 104 to the splined end 110 of the motor shaft 30. The bell housing 100 also includes an upper opening 112 in which the metering pump 76 is disposed and secured as illustrated. A gear 114 on the input shaft of the metering pump 76 is meshed with a gear 116 carried by an idler shaft 118 suitably journalled in an inwardly extending portion 120 of the housing 100. The end of the shaft 118 opposite the gear 116 mounts a gear 122 which is meshed with a gear 124 that is secured to the annular brake disc carrier 140 and in turn secured to the outer race 126 of the one-way clutch 72. Thus, only when the outer race 126 of the one-way clutch 72 is being driven will the metering pump 76 be driven.

The one-way clutch is, as mentioned previously, of the roller type and includes a plurality of rollers 128 which are interposed between the outer race 126 and the inner race 130 of the one-way clutch. Precise details of the interrelationship are well known and form no part of the present invention.

The inner race 130 of the one-way clutch 72 mounts radially inwardly extending splines 134 which are in engagement with radially outwardly extending splines 136 on one end of the hollow shaft 60. The outer race 126 of the clutch 72 is secured to an annular brake disc carrier 140 having a plurality of radially outwardly extending splines 142 thereon. Rotatable brake discs 144 are carried by the carrier 140 and in engagement with the splines 142.

Interleaved between the rotatable brake discs 144 are a plurality of stationary brake discs 146 with radially outwardly extending splines 148 which are in engagement with radially inwardly extending splines 147 carried by the inside of the brake housing 151. The discs 146 are axially slidable on the splines 148 and together with the discs 144 define a compressible, multiple disc pack. One end of the pack is in abutment with a side 150 of a radially extending housing member 152 while the opposite side is engaged by an annular piston 154.

Remote from the pack of discs 144 and 146, the piston 154 includes a radially outwardly directed flange 155 which sealingly engages the inner surface 156 of the bell housing 100, and, together with an annular ring 158 similarly engages the inner surface 156 as well as an axially directed part 160 of the piston 154 defines an annular, expandable chamber 162. A conduit 164 extends to the chamber 162. A plurality of springs, generally designated 166, are interposed between a radially extending part of the bell housing 100 and that part of the piston 154 remote from the brake pack and bias the piston 154 towards the discs 144 and 146 to compress the same and normally engage the brake 74 defined thereby.

The brake may be disengaged by directing fluid under pressure through the conduit 164 to the chamber 162 to move the piston 154 to the right as viewed in the drawings. The degree of disengagement will, of course, depend upon the pressure of the fluid applied to the chamber 162 as well as the bucking force provided by the biasing springs 166. Thus, when lowering the load against the brake, as alluded to previously, the rate of descent of the load can be selectively controlled by the degree of disengagement of the brake caused by the application of fluid to the chamber 162.

The winch drum 34 is defined by a hollow cylinder 170 having an annular, radially outwardly extending flange 172 at one end thereof. The flange 172 defines one end of the drum 34. The opposite end of the drum 34 is defined by a plate 174 secured, as by bolts 176, to the end of the hollow cylinder 170 remote from the flange 172. The plate 174 includes a central bore 178 and bearings 180 are interposed between the interior of the bore 178 and an axial projection 182 of the housing member 152. As illustrated, various retention formations are provided to hold the bearings 180 in place. Additionally, suitable oil seals 184 are also employed.

At its radially inner extremity, the plate 174 carries an axial projection 190 which is annular in nature and which includes radially outwardly extending splines 192 which are engaged with radially inwardly directed splines 194 carried by an end of the ring gear 70 of the third planetary gear set 62.

The planet gears 66 of the third set 62 are journalled as by bearings 196 on stub shafts 198 affixed to an annular, generally radially outwardly extending, flange 200 of a hollow cylinder 202 disposed concentrically about the hollow shaft 60. The end of the hollow cylinder 202 remote from the flange 200 is connected as by a splinded connection 204 to the housing member 152 within a bore 206 therein. Bearings 208 serve to journal the hollow shaft 60 within the interior of the hollow cylinder 202.

The end of the hollow shaft 60 remote from the brake 74 mounts, as by splines 210, a bell-shaped casting 212 having the ring gears 42 and 58 on its inner surface. The carrier 44 is defined by a hollow cylinder 214 having an annular, radially outwardly extending flange 216 which mounts stub shafts 218 which, in turn, journal, by suitable bearings, the planet gears 40 of the first planetary gear set 38. The interior of the hollow cylinder 214 includes radially inwardly extending splines 220 which slidably engage radially outwardly extending splines 222 on the hub 224 of a face gear 226. The face gear 226 is provided with teeth 228 on the right-hand side thereof and teeth 230 on the left-hand side thereof, as viewed in FIG. 5. The face gear 226, defines in part, the selectively operable coupling 48.

Specifically, the same is axially shiftable so that the teeth 230 may engage teeth 232 on a ring 234 affixed to the drum 34 within the hollow center thereof, or such that the teeth 228 engage a set of teeth 236. Alternatively, the face gear 226 may be disposed in the position illustrated in FIG. 5 which corresponds to the neutral or uncoupled position.

The teeth 236 are disposed on the side of the sun gear 50 of the second planetary gear set 52. The sun gear 50 is journalled as by bearings 240 on the hollow cylinder 214.

The planet gears 56 of the second planetary gear set 52 are journalled by any suitable bearings on stub shafts 242 which are carried by the interior of the drum 34 and which also are secured to a carrier 244 journalled as by bearings 246 on the hollow cylinder 214.

The winch assembly further includes a housing 250 partially surrounding the winch drum 34 and open at one end so that cable 252 may be wound upon or payed off of the drum 34. Bearings 254 carried by the housing 250 journal the left-hand end of the drum 34 in the manner illustrated. The housing 250 includes a bore 256 which receives the bearings 254 and which is partially closed by a casting 258. Secured to the casting 258, by means of bolts 260, is the outer race 262 of the sprag brake 54. The inner race 264 of the sprag brake 54 includes inwardly extending splines 266 which engage, slidably, radially outwardly extending splines 268 on one end of the shaft 46. Sprag brake elements 270, naturally, are interposed between the inner and outer races 262 and 264 of the brake 54.

A cap 272 is abutted against one side of the sprag brake 54 and held in place by the bolts 260 and includes a hydraulic port 274 facing the left-hand end of the shaft 46. The shaft 46, intermediate its ends, includes a smooth surface 276 which is engaged by a bushing 278 which sealingly and slidably engages the shaft 46. As a consequence, a chamber for receipt of pressurized fluid is defined on the left-hand side of the seal 278, as illustrated in FIG. 5.

The casting 258 includes a fluid inlet port 280 which extends to a chamber 282 about the shaft 46 on the right-hand side of the bushing 278, and specifically, to a reduced diameter portion 284 of the shaft 46. Within the chamber 282, there is a conventional spring mechanism, generally designated 286, and a similar spring mechanism, generally designated 288, is located on the interior of the hub 224 of the face gear 226 and connected to the shaft 46 by means of a bolt 290. The spring mechanisms 286 and 288 are designed to locate the face gear 226 in the position illustrated when hydraulic pressure is not being applied to the shaft 46 either in the chamber 282 or through the port 274. They define a conventional centering mechanism.

When it is desired to couple the first planetary gear set 38 to the second set 52, the face gear 226 is shifted to the right, as viewed in FIG. 5, by the application of hydraulic fluid under pressure to both the port 274 and the port 280. This provides low speed elevation of the load carried by the winch. Conversely, when a high speed elevation is required, pressure at the port 274 is relieved while pressurized fluid is directed to the port 280 to drive the shaft 46 to the left, thereby engaging the face gear 226 with the gear 232 carried by the winch drum 34.

From the foregoing general description, it is believed that the interaction of the various components is clear without a further description of the operation thereof. At the same time, from the foregoing specific description of the various components, the best mode of the invention contemplated has been described above. Those skilled in the art will recognize that the invention operates to perform the various functions previously specified and that a multiple-speed winch which is compact is provided thereby. It will also be appreciated that the invention allows an initial warmup without changing drum and load conditions through the provision of the face gear 226 and its neutral position and that construction allows the powering out of the cable without causing cavitation in the hydraulic motor 102.

It will also be appreciated that while the specific construction disclosed is but a two-speed winch, it is readily adaptable to a greater number of speeds without changing the size of the various components. For example, the gears of the third set 62 are quite large by comparison to those of the first and second sets and could be made considerably smaller thereby providing room for stil an additional set of gears which could be utilized for providing one or more additional speeds by structure made according to the principles of the invention as has been described hereinabove.

The embodiments of the invention in which an exclusive property or priviledge is claimed are defined as follows:

1. A winch construction comprising:
- a winch drum journalled for rotation and having a hollow hub;
- a motor having a rotary output for driving said drum;
- a transmission comprising at least two planetary gear sets disposed within said hollow hub for coupling said motor and said drum; and
- means for selectively coupling said planetary gear sets to said motor and said drum in at least two different gear ratios;
- one of said planetary gear sets being coupled to said motor and the other of said planetary gear sets being coupled to said drum, and said selective coupling means comprising means for alternately serially coupling said sets together and for coupling said one planetary gear set directly to said drum.

2. The winch of claim 1 wherein said one planetary gear set comprises a first sun gear driven by said motor, at least one first planet gear engaging said first sun gear, and a carrier mounting said first planet gear and having an axially shiftable member; and wherein said other plenatary gear set comprises a second sun gear, and at least one planet gear carried by said winch drum within said hollow hub, said axially shiftable member being alternatively drivingly engageable with said second sun gear and said winch drum.

3. The winch of claim 2 wherein said axially shiftable member comprises a face gear having teeth on opposed faces thereof.

4. The winch of claim 2 further including interconnected, relatively nonrotatable ring gears for each of said planetary gear sets within said hub; a normally engaged brake; and means including a one-way clutch coupling said ring gears to said brake.

5. The winch of claim 4 wherein said last-named means comprise a hollow shaft rotatable about an axis concentric with the axis of rotation of said sun gears, said first sun gear being driven by a shaft driven by said motor and within said hollow shaft, said hollow shaft mounting a third sun gear within said hub, at least one third planet gear engaging said third sun gear and journalled in a fixed location, and a third ring gear carried by said drum within said hub and engaging said third planet gear.

6. A winch construction comprising:
- a frame;
- a winch drum journalled for rotation on said frame;
- a motor on said frame for driving said winch drum;
- a first planetary gear set having a first sun gear, at least one first planet gear in engagement therewith and a first ring gear in engagement with said first planet gear;
- a second planetary gear set, at least one second planet gear in engagement therewith and a second ring gear in engagement with said second planet gear;
- means coupling one of said first gears to said motor to be driven thereby;
- means coupling one of said second gears to said drum; and
- means for selectively coupling another of said first gears alternatively to another of said second gears and to said drum.

7. The winch of claim 6 wherein said drum has a hollow hub and said planetary gear sets within said hub.

8. The winch of claim 6 wherein said first planetary gear set includes a rotatable carrier journalling said first planet gear, and wherein said selective coupling means is operable to connect said carrier to said second sun gear.

9. A winch construction comprising:
- a winch drum journalled for rotation;

a motor having a rotary output for driving said drum;

a transmission comprising at least two planetary gear sets for coupling said motor and said drum; and means for selectively coupling said planetary gear sets to said motor and said drum in at least two different gear ratios, and including an axially shiftable face gear having teeth on opposite sides thereof, said face gear being coupled to one of said planetary gear sets and being shiftable between positions coupling said one set to said drum and to the other of said planetary gear sets.

10. The winch of claim 9 wherein said face gear is coupled to a carrier for planet gears in said one set and may be coupled to a sun gear in said other set.

11. The winch of claim 9 wherein said face gear is shiftable to a further position uncoupled with either said drum and said other set; and means normally urging said face gear to said furthr position whereby said motor may be energized to drive at least said one set for warmup purposes.

12. A winch construction comprising:

a frame;

a winch drum journalled on said frame;

a bidirectional, rotary output, hydraulic motor for driving said drum;

a first planetary gear set connected to said motor and connectable directly to said drum;

a second planetary gear set coupled to said drum and to said first planetary gear set; and a one-way clutch coupled to said first set such that for one direction of rotation of said motor, and when said first set is coupled to said drum, said drum will be positively driven in one direction and for the opposite rotation of said motor, a part of said first set will be braked to drive said drum through said second set in the opposite direction and allow said drum to overrun said motor while precluding cavitation in said motor.

13. The winch of claim 13 further including a normally engaged brake, and means coupling said brake to said drum and including an additional one-way clutch arranged to be overrun when said brake is engaged and said motor is operating in said one direction.

14. The winch of claim 12 wherein said first set includes a sun gear, at least one planet gear engaged therewith and journalled on a rotatable carrier, and a ring gear engaging said planet gear and coupled to said second set, said one-way clutch being coupled to said carrier and mounted on said frame.

15. A winch construction comprising: a frame; a winch drum journalled for rotation on said frame and having a hollow hub; a bidirectional, rotary output, hydraulic motor mounted on said frame and having an output shaft extending into said hollow hub; a first set of planetary gears within said hollow hub and including a sun gear driven by said shaft, at least one planet gear engaging said sun gear and journalled on a rotatable carrier, and a ring gear engaging said planet gear; a second planetary gear set within said hub and including a sun gear, at least one planet gear engaging said sun gear and journalled on said drum within said hub, and a ring gear engaging said planet gear; an axially shiftable face gear coupled to said carrier for rotation therewith; means for selectively axially shifting said face gear between positions engaging said sun gear of said second set and said drum within said hub; a hollow shaft concentric about said motor shaft and extending within said hub; a third planetary gear set within said hub and including a sun gear affixed to said hollow shaft, at least one planet gear engaging said sun gear and journalled on said frame, and a ring gear engaging said planet gear and carried by said drum within said hub; means coupling the ring gears of said first and second sets to said hollow shaft; a normally engaged brake mounted on said frame; and means, including a one-way clutch, coupling said hollow shaft to said brake.

16. The winch construction of claim 15 further including a metering pump, and means interconnecting said metering pump and said one-way clutch remote from said hollow shaft.

17. The winch construction of claim 15 further including an additional one-way clutch mounted on said frame and connected to said carrier of said first set.

18. The winch of claim 17 wherein said additional one-way clutch is connected to a shaft rotatable within said frame, and wherein said face gear is mounted on said shaft and connected by splines to said carrier of said first set.

19. A winch construction comprising:

a winch drum journalled for rotation;

a motor having a bidirectional rotary output for driving said drum;

a transmission comprising at least two planetary gear sets for coupling said motor and said drum; and means for selectively coupling said planetary gear sets to said motor output and said drum in at least two different gear ratios for either direction of said motor output, and including a face gear having teeth on opposite sides thereof and axially shiftable between high, low and an intermediate neutral position and means for selectively axially shifting said face gear between said positions for either direction of said motor output.

* * * * *